United States Patent [19]

Ban

[11] Patent Number: 5,829,675
[45] Date of Patent: Nov. 3, 1998

[54] METHOD AND APPARATUS FOR CONTROLLING OPERATION OF AUXILIARY HEATING SYSTEM OF VEHICLE

[75] Inventor: Takashi Ban, Kariya, Japan

[73] Assignees: Kabushiki Kaisha Toyoda Jidoshokki Seisakusho, Kariya; Toyota Jidosha Kabushiki Kaisha, Toyota; Denso Corporation, Kariya, all of Japan

[21] Appl. No.: 835,311

[22] Filed: Apr. 7, 1997

[30] Foreign Application Priority Data

Apr. 8, 1996 [JP] Japan .................................. 8-085406

[51] Int. Cl.⁶ ........................................................ B60H 1/02
[52] U.S. Cl. ........................ 237/12.3 R; 122/26; 126/247
[58] Field of Search ........................ 237/12.3 B, 12.3 R; 126/247; 122/26

[56] References Cited

U.S. PATENT DOCUMENTS

| | | | |
|---|---|---|---|
| 4,733,635 | 3/1988 | Menard et al. | 237/12.3 B |
| 4,773,388 | 9/1988 | Herbulot et al. | 126/247 |
| 4,993,377 | 2/1991 | Itakura . | |
| 5,063,513 | 11/1991 | Shank et al. | 237/12.3 R |
| 5,573,184 | 11/1996 | Martin . | |

FOREIGN PATENT DOCUMENTS

| | | |
|---|---|---|
| 60-138822 | 9/1985 | Japan . |
| 61-30884 | 9/1986 | Japan . |
| 2246823 | 2/1990 | Japan . |
| 2254010 | 10/1990 | Japan . |
| 357877 | 3/1991 | Japan . |
| 692134 | 4/1994 | Japan . |

*Primary Examiner*—Henry A. Bennett
*Assistant Examiner*—Derek S. Boles
*Attorney, Agent, or Firm*—Brooks Haidt Haffner & Delahunty

[57] ABSTRACT

A method for controlling a viscous heater for a vehicle. The vehicle has an engine, an engine cooling system for heating coolant, a passage, a radiator and the viscous heater. The radiator heats the passage using heat from the coolant. The viscous heater uses the driving force of the engine to heat the coolant separately from the engine cooling system. The method includes a step of cutting off the transfer of the driving force of the engine to the viscous heater when the engine is being started. The method also includes a step of transferring the driving force of the engine to the viscous heater when the engine is running.

12 Claims, 10 Drawing Sheets

Fig.10 ably 5,829,675

METHOD AND APPARATUS FOR CONTROLLING OPERATION OF AUXILIARY HEATING SYSTEM OF VEHICLE

BACKGROUND OF THE INVENTION

1. Field of the Invention

The present invention relates to a method and an apparatus for controlling the operation of an auxiliary heating system of a vehicle.

2. Description of the Related Art

A conventional auxiliary heating system is disclosed in Japanese Unexamined Patent Publication No. 2-254010. In this prior art, a viscous heater for generating heat by agitating viscous fluid is used as the auxiliary heating system. The viscous heater is driven by an engine through an electromagnetic clutch. A coolant temperature sensor is located in a coolant passage. An electromagnetic coil in the electromagnetic clutch receives energization control from a controller in accordance with the coolant temperature detected by the coolant temperature sensor. When the coolant temperature is equal to or lower than a set value, the viscous heater generates heat because the electromagnetic coil is energized and the electromagnetic clutch engages. When the coolant temperature is equal to or higher than the set value, the viscous heater does not generate heat because the electromagnetic coil is not energized and, the electromagnetic clutch is disengaged. That is, when the temperature of coolant heated by the heat of the engine is too low to heat the inside of the vehicle, the viscous heater generates heat to assist the heating of the inside of the vehicle.

However, the driving force for operating the viscous heater results in a load on the engine. Therefore, it is difficult to start the engine smoothly due to the operation of the viscous heater. The same problem occurs when using an auxiliary heating system to be operated by the driving force of a gear pump heater or an eddy current heater.

SUMMARY OF THE INVENTION

The present invention can be implemented in numerous ways, including as a method and an apparatus.

Firstly, the present invention relates to a method for controlling an auxiliary heating system for a vehicle. The vehicle has an engine, an engine cooling system in which coolant is heated by the engine, a passenger compartment, a main heating system and an auxiliary heating system. The main heating system heats the passenger compartment using heat from the coolant. The auxiliary heating system uses the driving force of the engine to heat the coolant separately from the engine cooling system. The method includes a step of cutting off the transfer of the driving force of the engine to the auxiliary heating system when the engine is being started. The method also includes a step of transferring the driving force of the engine to the auxiliary heating system when the engine is running.

The present invention also relates to an auxiliary heating control apparatus for a vehicle. The apparatus includes torque transfer means for transferring the driving force of the engine to a heat generating means, means for judging whether the engine has reached a predetermined running condition, and control means for switching the torque transfer means between an engaged state and a disengaged state. The torque transfer means has an engaged state where the driving force of the engine is transferred to the heat generating means and a disengaged state where the heat generating means is not operated. The control means switches the torque transfer means to the engaged state only when the judging means judges that the engine has reached the predetermined running condition.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

The first embodiment of the present invention will be described below by referring to FIGS. 1 to 3.

Figure 1:
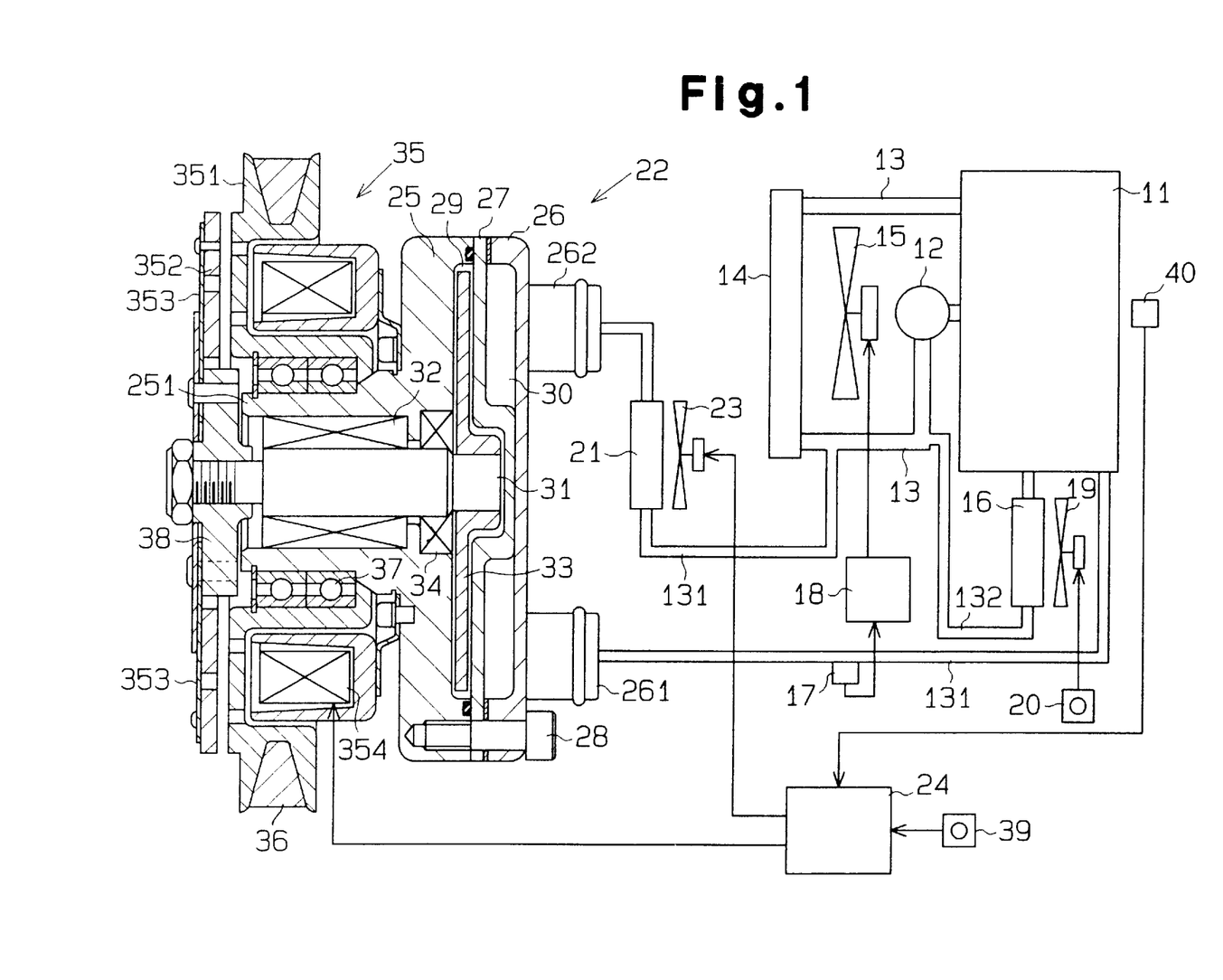
FIG. 1 is a cross-section schematic diagram showing the outline of a main heating system and an auxiliary heating system of a first embodiment of the present invention, wherein the electromagnetic clutch is shown disengaged.
Figure 2:
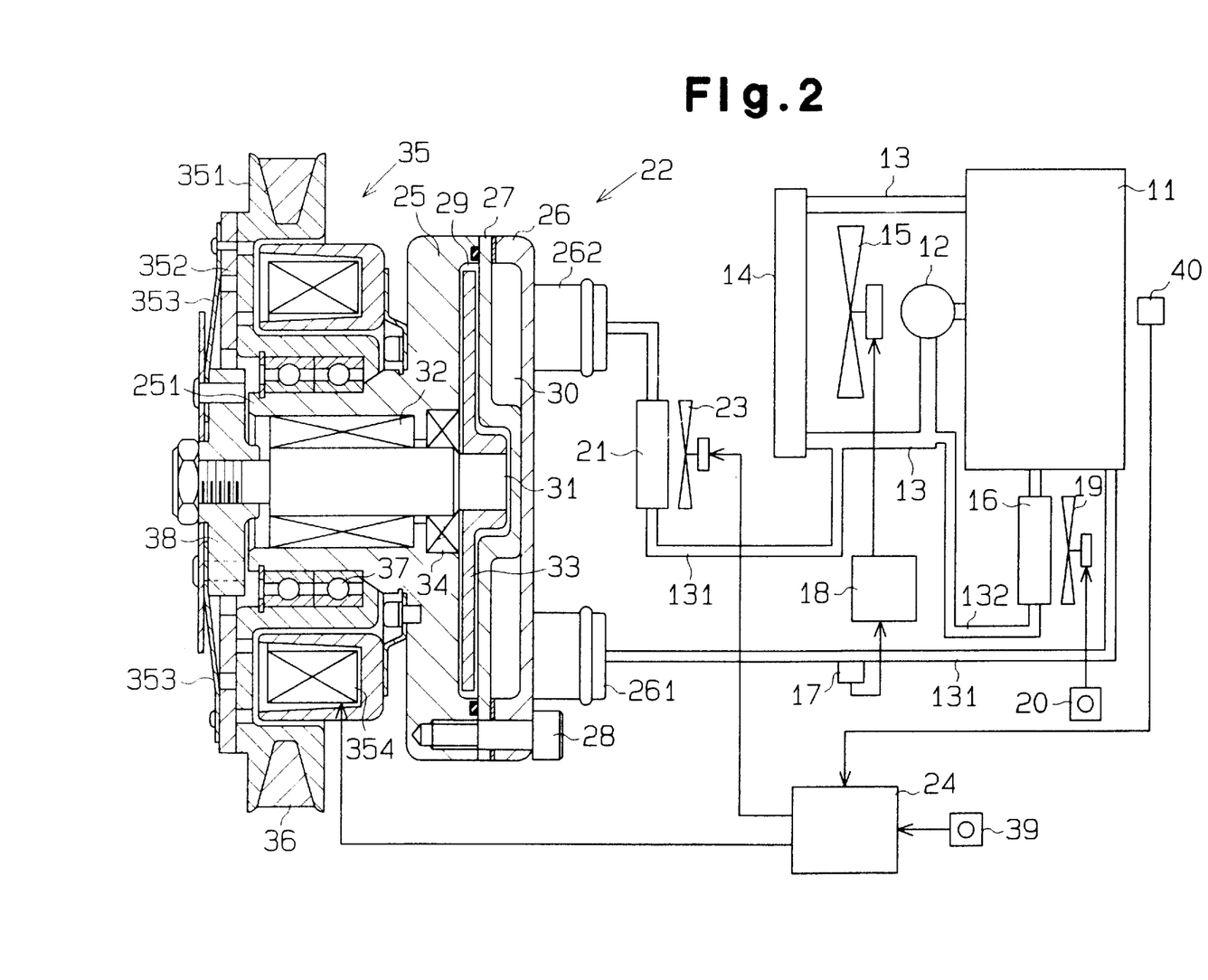
FIG. 2 is a cross-section schematic diagram showing the outline of the main heating system and the auxiliary heating system of the first embodiment, wherein the electromagnetic clutch is shown engaged.

As shown in FIGS. 1 and 2, a vehicle engine 11 is cooled by the coolant circulated through a passage 13 by a water pump 12. Heat is removed from the coolant circulated through the passage 13 with a conventional radiator 14. An electric cooling fan 15 assists in cooling the radiator 14. The passage 13 is provided with first and second auxiliary passages 131 and 132 and the first auxiliary passage 131 is provided with a temperature sensor 17. The temperature sensor 17 detects the temperature of the coolant flowing through the first auxiliary passage 131. A controller 18 controls the operation of the cooling fan 15 in accordance with the temperature data detected by the temperature sensor 17. When the coolant temperature detected by the temperature sensor 17 does not reach a predetermined coolant temperature, the controller 18 does not operate the cooling fan 15; whereas when the detected coolant temperature reaches the predetermined coolant temperature, the controller 18 operates the cooling fan 15.

A radiator 16 is set in the second auxiliary passage 132. Heat is removed from the coolant flowing through the second auxiliary passage 132 due to the heat transfer effect of air from cooling fan 19 flowing through the radiator 16.

The cooling fan 19 operates when a main heating switch 20 is turned on and the hot air from the radiator 16 is sent to the inside of the vehicle.

A radiator 21 and a viscous heater 22 are connected to the first auxiliary passage 131. Heat is removed from the coolant flowing through the first auxiliary passage 13 due to the heat transfer effect of air from cooling fan 23 flowing through the radiator 21. The cooling fan 23 is controlled by an auxiliary heating controller 24. An auxiliary heating system comprises the radiator 21, the viscous heater 22, the cooling fan 23, and the auxiliary heating controller 24.

The structure of the viscous heater 22 will now be described below. A partition plate 27 having very high heat conductivity is located between a front housing 25 and a rear housing 26. The rear housing 26 is fixed to the front housing 25 by a bolt 28, which passes through the partition plate 27. The front housing 25 has a support cylinder 251. A heat generating chamber 29 is formed between the partition plate 27 and the front housing 25, and a water jacket 30 is formed between the partition plate 27 and the rear housing 26. The water jacket 30 is connected to the auxiliary passage 131 through an incoming-water port 261 and an outgoing-water port 262. Coolant moved from the engine 11 in the auxiliary passage 131 comes into the water jacket 30 from the incoming-water port 261 and goes out from the outgoing-water port 262. The water exiting going from the water jacket 30 flows to the radiator 21.

A rotary shaft 31 is rotatably supported by the front housing 25 through a radial bearing 32. A rotor 33 having a disc shape is secured to the distal end of the rotary shaft 31. The rotor 33 is located in the heat generating chamber 29. Viscous fluid made of silicone oil is sealed in the heat generating chamber 29. A sealing mechanism 34 is provided between the front housing 25 and the rotary shaft 31 to prevent the viscous fluid from leaking.

An electromagnetic clutch 35 is located on the outer periphery of the support cylinder 251. The electromagnetic clutch 35 has a pulley 351, which is rotatably supported by the support cylinder 251 through an angular bearing 37. The pulley 351 serves as a first clutch plate of the electromagnetic clutch 35, to which the driving force of the engine 11 is transferred through a belt 36.

A support ring 38 is secured to the proximal end of the rotary shaft 31. A second clutch plate 352 of the electromagnetic clutch 35 is supported by the support ring 38 through a leaf spring 353. The electromagnetic clutch 35 has a solenoid 354 which is controlled by the auxiliary heating controller 24. When the solenoid 354 is excited, the clutch plate 352 is caused to contact the rear face of the pulley 351 against the spring force of the leaf spring 353 as shown in FIG. 2. When excitation of the solenoid 354 is stopped, the clutch plate 352 is separated from the rear face of the pulley 351 by the spring force of the leaf spring 353 as shown in FIG. 1.

The rotational speed of the engine 11 is detected by an engine speed detector 40. The auxiliary heating controller 24 energizes the electromagnetic clutch 35 in accordance with the engine speed information sent from the engine speed detector 40 when an auxiliary heating switch 39 is turned on.

Figure 3:
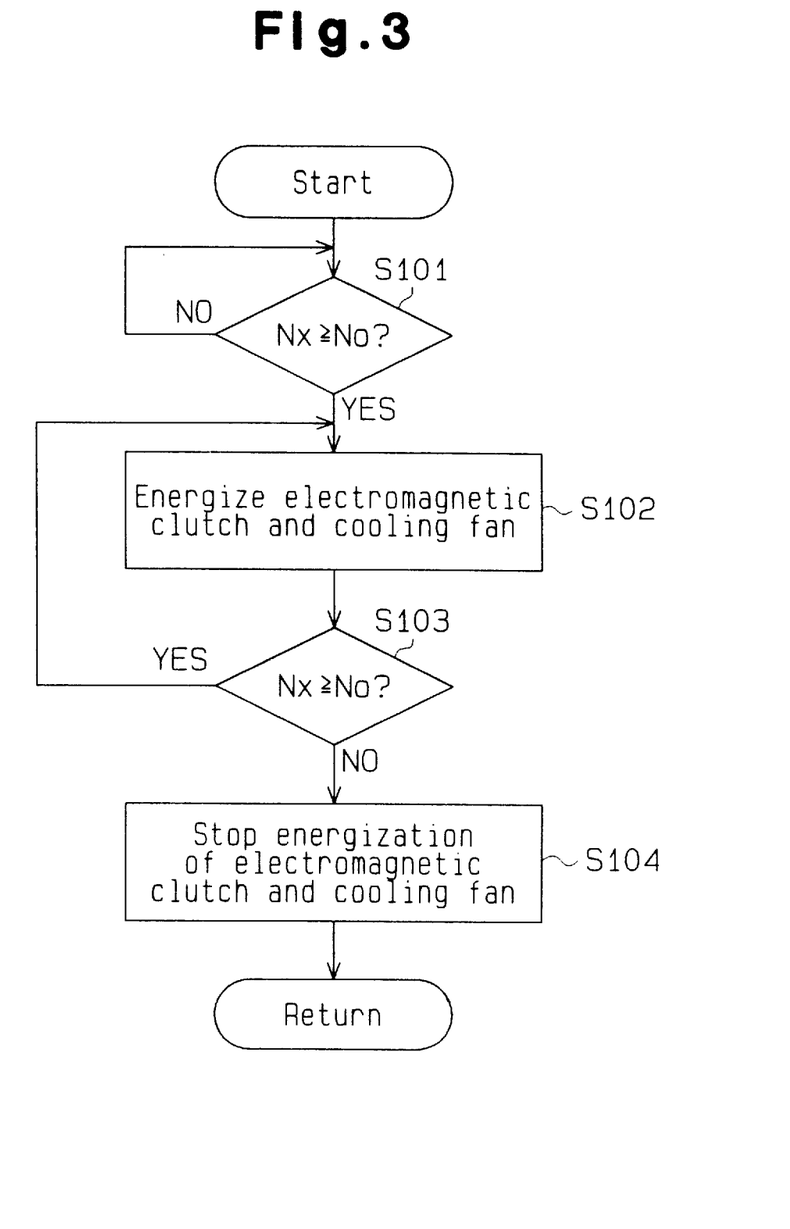
FIG. 3 is a flow chart showing a process for controlling the auxiliary heater.

FIG. 3 is a flow chart showing the energization control process for the electromagnetic clutch 35 and the cooling fan 23 by the auxiliary heating controller 24. In the routine shown by this flow chart, the engine 11 is started while the auxiliary heating switch 39 is turned on. The rotational speed of the engine 11 is detected by the engine speed detector 40, which outputs engine speed information to the auxiliary heating controller 24.

In step S101, the auxiliary heating controller 24 determines whether a rotational speed Nx of the engine 11 has reached a preset rotational speed No. When the controller 24 decides "YES", the electromagnetic clutch 35 and the cooling fan 23 are energized in step S102. That is, the solenoid 354 is excited and the clutch plate 352 is engaged with the pulley 351 as shown in FIG. 2.

When the electromagnetic clutch 35 is engaged, the driving force of the engine 11 is transferred to the rotary shaft 31 through the belt 36, pulley 351, clutch plate 352, and support ring 38, and therefore, the rotor 33 is driven. The viscous fluid in the heat generating chamber 29 is agitated due to the rotation of the rotor 33 and heat is generated due to the agitation of the fluid. The generated heat is transferred to the water in the water jacket 30 through the partition plate 27, and the water in the water jacket 30 is heated and subsequently exits from the outgoing-water port 262. When the heated water moves to the radiator 21, heat is removed from the heated water by the cooling fan 23 and the inside of the vehicle is heated by the heat.

In step S103, the auxiliary heating controller 24 determines whether the rotational speed Nx of the engine 11 exceeds the preset rotational speed No. While the engine 11 operates, the rotational speed Nx of the engine 11 exceeds the preset rotational speed No. When the engine 11 is stopped, the rotational speed Nx of the engine 11 becomes less than the preset rotational speed No, and consequently, in step S103, "NO" is decided. Then, in step S104, energization of the electromagnetic clutch 35 and the cooling fan 23 is stopped. When the energization of the electromagnetic clutch 35 is stopped, the solenoid 354 is demagnetized. Then, as shown in FIG. 1, the clutch plate 352 separates from the pulley 351. That is, the electromagnetic clutch 35 is disengaged. Because the electromagnetic clutch 35 is disengaged, the driving force of the engine 11 is not transferred to the rotary shaft 31, and thus the rotation of the rotor 33 stops.

The following advantages are obtained in the first embodiment of the invention.

Because the electromagnetic clutch 35, which serves as a torque transfer means, is not operated when the engine 11 starts, the driving force of the engine 11 is not transferred to the viscous heater 22. That is, when the engine 11 starts, the clutch plate 352 of the electromagnetic clutch 35 is separated from the pulley 351. Therefore, the engine 11 is easily started because the driving torque for driving the viscous heater 22 does not load the engine 11.

The preset rotational speed No is preferably a rotational speed at which the engine is capable of running. Therefore, a rotational speed that is slightly lower than normal idling speed is preferable. Until the rotational speed of the engine 11 reaches the preset rotational speed No, the electromagnetic clutch 35 remains disengaged. The method of detecting the rotational speed of the engine 11 and performing energization control of the electromagnetic clutch 35 guarantees that the viscous heater 22 is not operated until the engine 11 is actually running.

Because the rotational speed of the engine 11 is detected by the existing engine speed detector 40, a separate engine speed detector for performing energization control of the electromagnetic clutch 35 is unnecessary.

The viscous heater 22 has a high heat-generating efficiency and moreover, it is compact. However, viscous fluid which has not been agitated for a long time has a high viscosity, and therefore, the viscous heater 22 has a large initial load due to the initial viscosity. However, because the electromagnetic clutch 35 is disengaged when the engine 11 is started, the driving force of the engine 11 is not transferred to the viscous heater 22 when the viscous fluid has the maximum viscosity. Therefore, smooth starting of the engine 11 is possible despite the use of the viscous heater 22.

Figure 4:
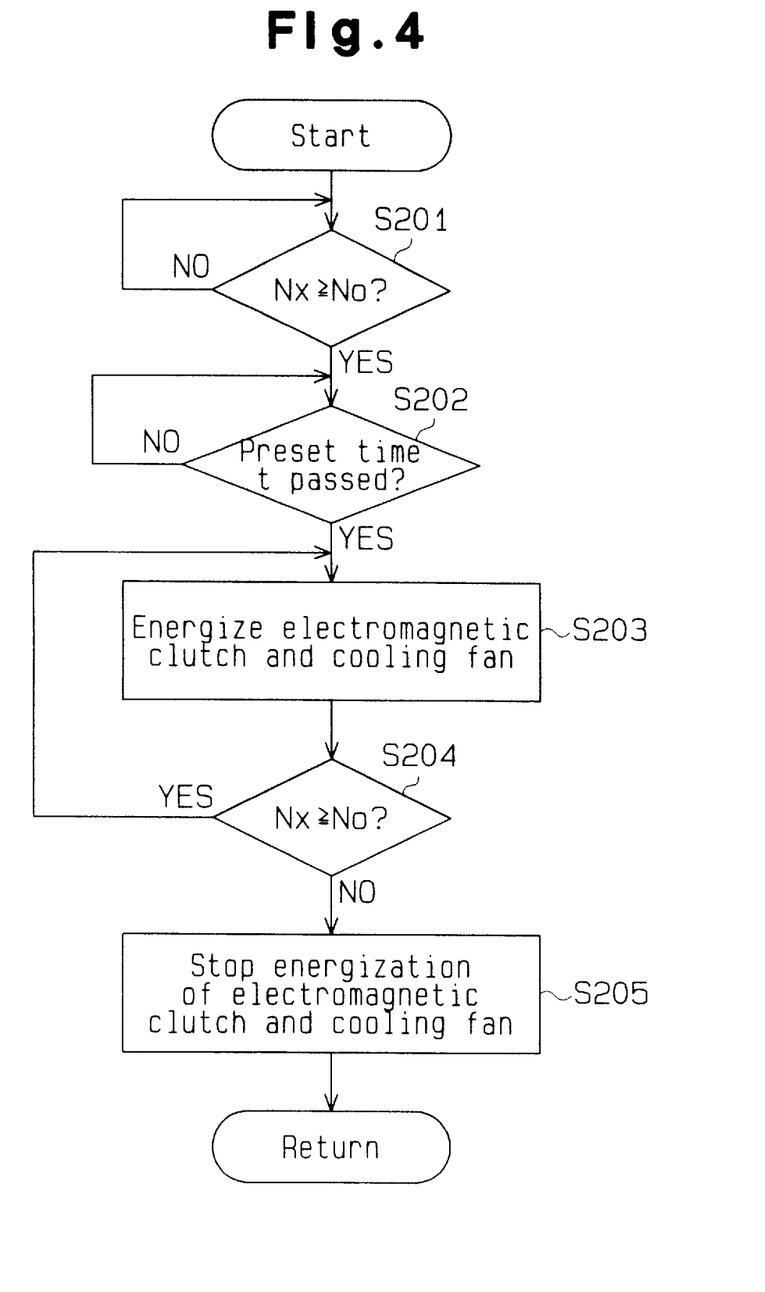
FIG. 4 is a flow chart showing a process for controlling the auxiliary heater according to a second embodiment.

Next, the second embodiment of the invention will be described below with reference to the flow chart shown in FIG. 4. This embodiment has the same mechanical structure as the first embodiment. However, the auxiliary heating control process is changed. In the routine shown by the flow chart, the engine 11 is started while the auxiliary heating switch 39 is turned on.

In step S201, the auxiliary heating controller 24 determines whether the rotational speed Nx of the engine 11 has reached the preset rotational speed No. When the controller 24 decides "YES", it proceeds to decide in step S202 whether the rotational speed Nx of the engine 11 has reached the preset rotational speed Nx for a preset time t.

When "YES" is decided in step S202, the process goes to step S203. Hereafter, steps S203 to S205 are the same as steps S102 to S104 of the first embodiment.

The following advantages are obtained in the second embodiment.

The electromagnetic clutch 35 remains disengaged until the rotational speed Nx of the engine 11 reaches the preset rotational speed No and further until a preset time t passes. By setting such a delay period, the auxiliary heating system operates only after the engine 11 positively starts. Therefore, the engine 11 is positively running before the auxiliary heating system starts.

Figure 5:
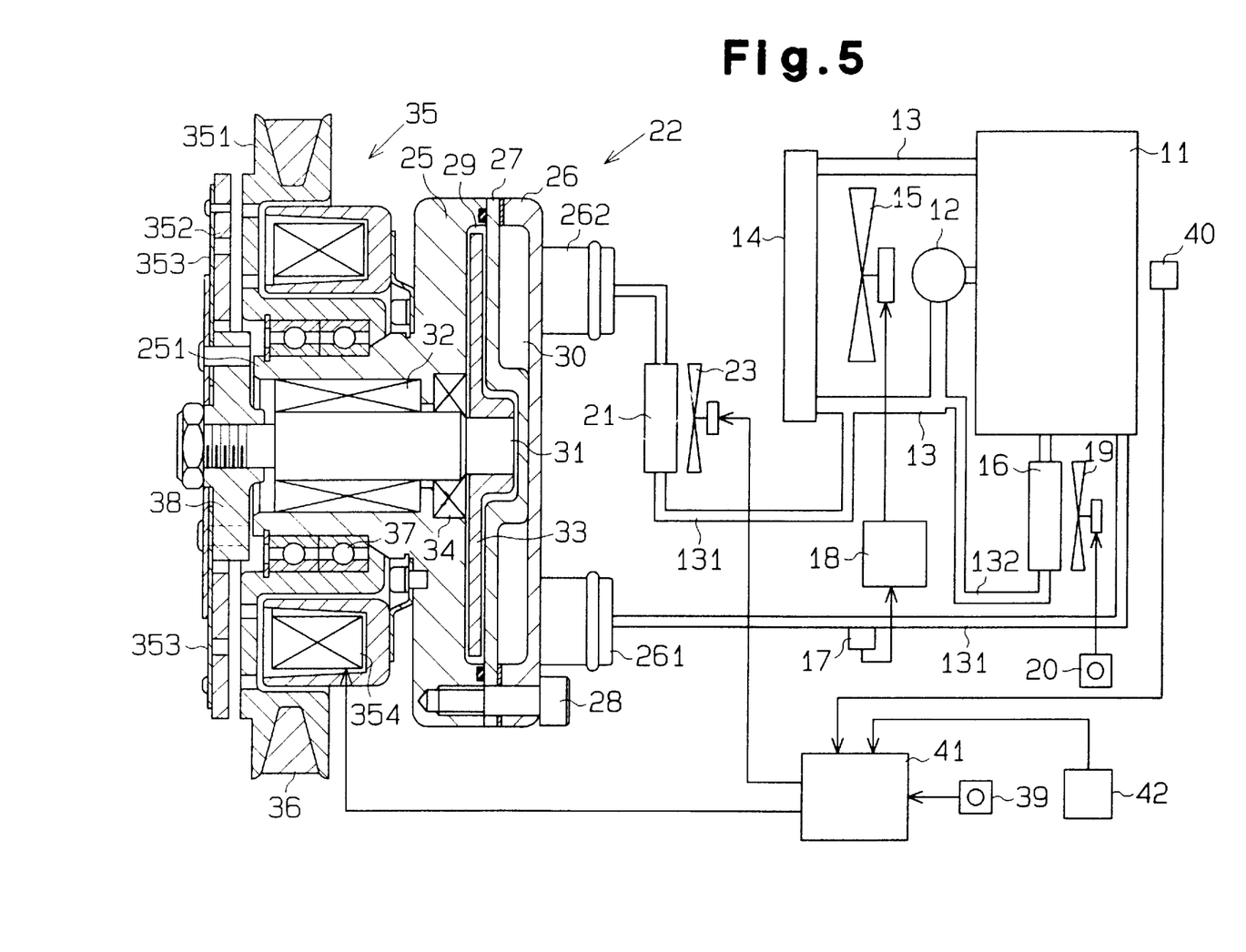
FIG. 5 is a cross-section schematic diagram showing the outline of a main heating system and an auxiliary heating system of a third embodiment.

Now, the third embodiment will be described referring to FIGS. 5 and 6. In FIG. 5, components that are the same as those of the first embodiment are identified with the same reference numerals.

In this embodiment, an ignition switch 42 is connected to an auxiliary heating controller 41. When the engine starting operation is initialized, the ignition switch 42 outputs a signal indicating that the engine 11 is being started to the auxiliary heating controller 41. The auxiliary heating controller 41 operates only when the auxiliary heating switch 39 is turned on.

Figure 6:
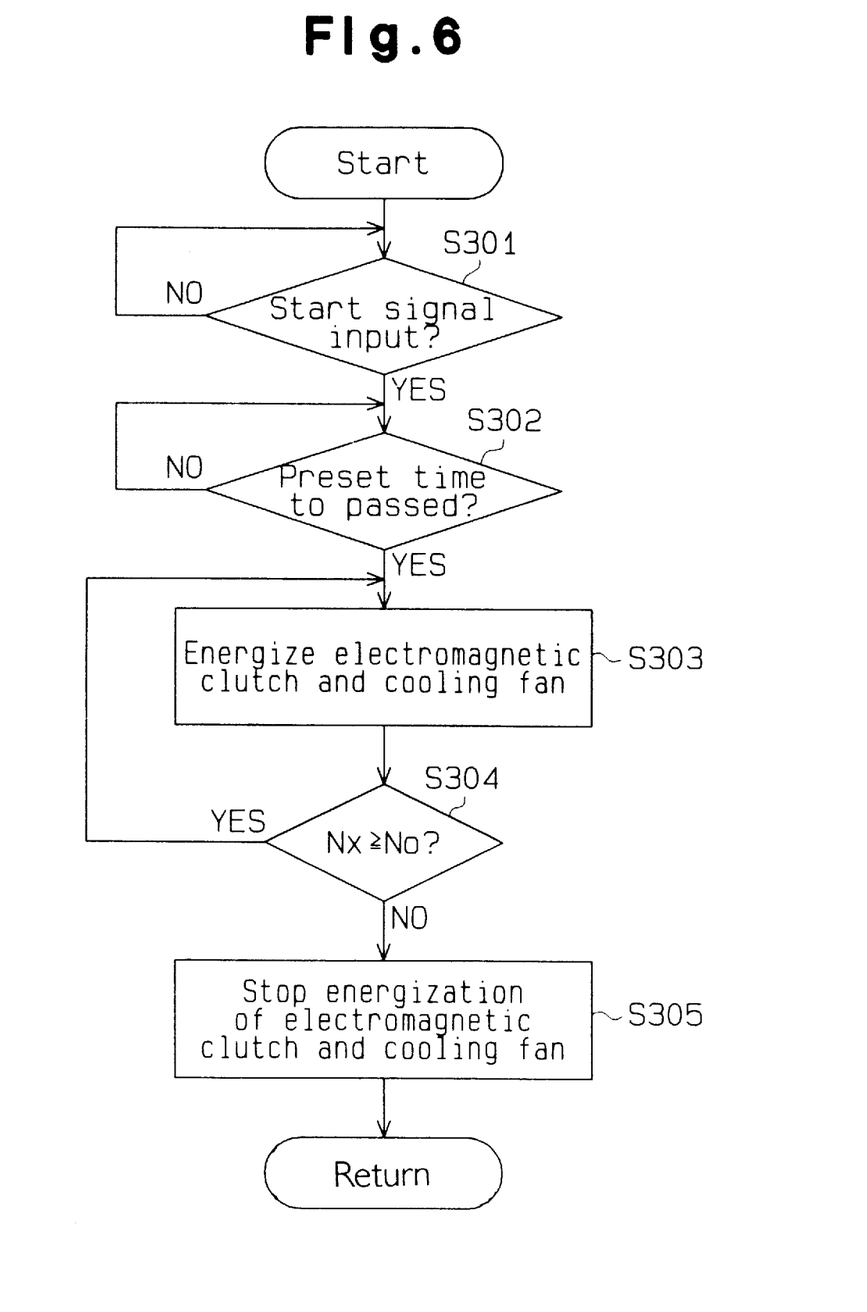
FIG. 6 is a flow chart showing a process for controlling the auxiliary heater according to the third embodiment.

FIG. 6 is a flow chart showing the energization control of the electromagnetic clutch 35 and the cooling fan 23 by the auxiliary heating controller 41. In the routine shown by FIG. 6, the engine 11 is started while the auxiliary heating switch 39 is turned on. In step S301, the auxiliary heating controller 41 determines whether a start signal is input. When the auxiliary heating controller 41 decides "YES" in step S301, it proceeds to determine in step S302 whether a preset time t0 has passed after the input of the signal. When "YES" is decided in step S302, step S303 is executed. The steps S303 to S305 are the same as steps S102 to S104 of the first embodiment.

The following advantages are obtained in the third embodiment.

The preset time t0 is longer time than the time estimated for the engine 11 to reach a running speed after the engine starting operation is initialized. The electromagnetic clutch 35 is disengaged until the preset time t0 passes after the initialization of starting the engine 11. By properly setting the preset time t0, it is possible to positively prevent the viscous heater 22 from operating until the engine 11 securely starts.

Figure 7:
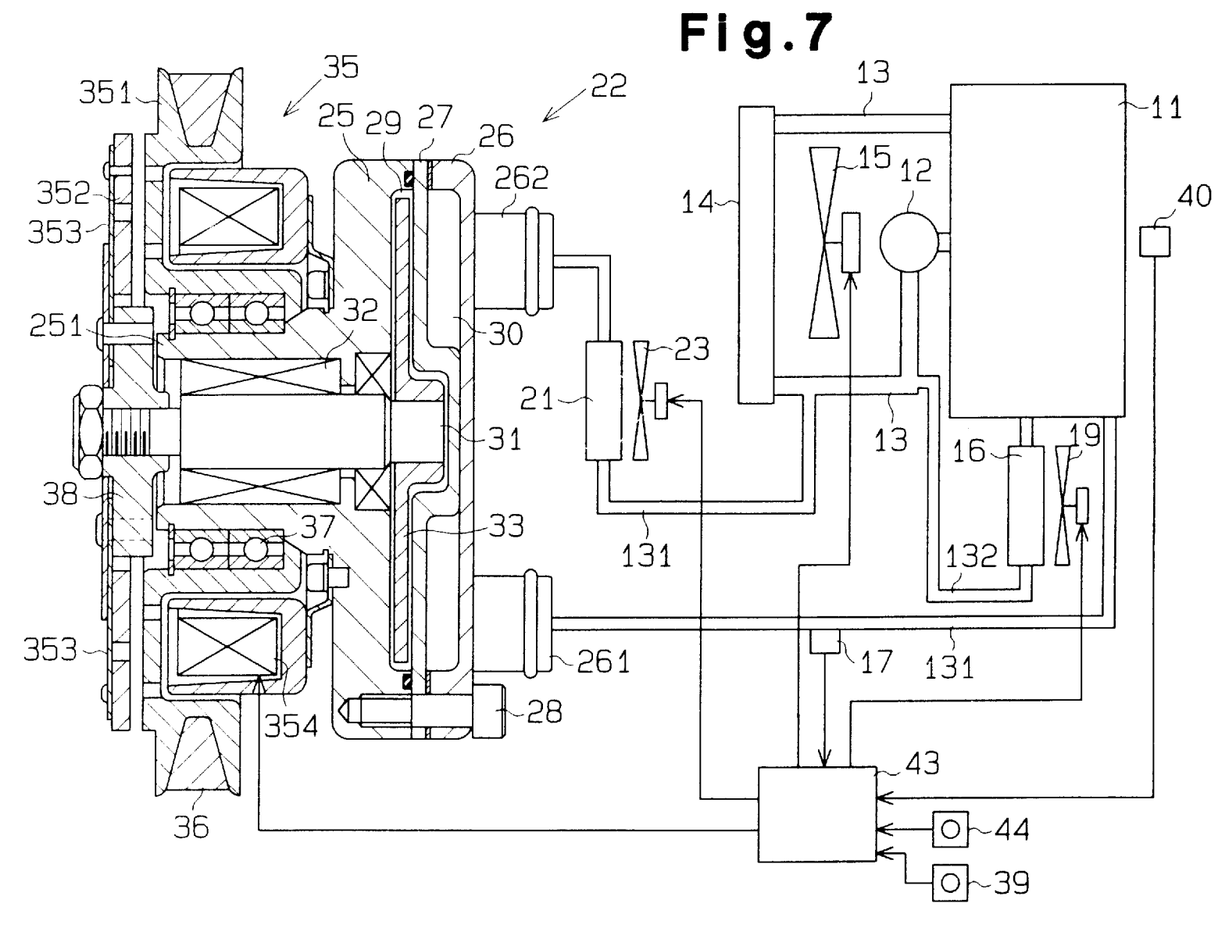
FIG. 7 is a cross-section schematic diagram showing the outline of a main heating system and an auxiliary heating system of a fourth embodiment.

Next, the fourth embodiment will be described below by referring to FIGS. 7 and 8. In FIG. 7, components that are the same as those of the first embodiment are identified with the same reference numerals.

In this embodiment, the energization control for the cooling fans 15, 19, and 23 and the electromagnetic clutch 35 are performed by an auxiliary heating controller 43. In this embodiment, when energizing the cooling fan 19, heating is performed by a main heating system. Therefore, the energization of the fan 19 is referred to as main energization. Moreover, when energizing the electromagnetic clutch 35 and the cooling fan 23, heating is performed by an auxiliary heating system, so that the energization of the clutch 35 and the fan 23 is referred to as auxiliary energization. The temperature sensor 17 and a heating switch 44 are connected to the auxiliary heating controller 43. The auxiliary heating controller 43 controls the operation of the cooling fan 15 in accordance with the detected coolant temperature information obtained from the temperature sensor 17. The auxiliary heating controller 43 becomes ready for control of the electromagnetic clutch 35 and the cooling fans 23 and 19 only while the auxiliary heating switch 39 is turned on.

Figure 8:
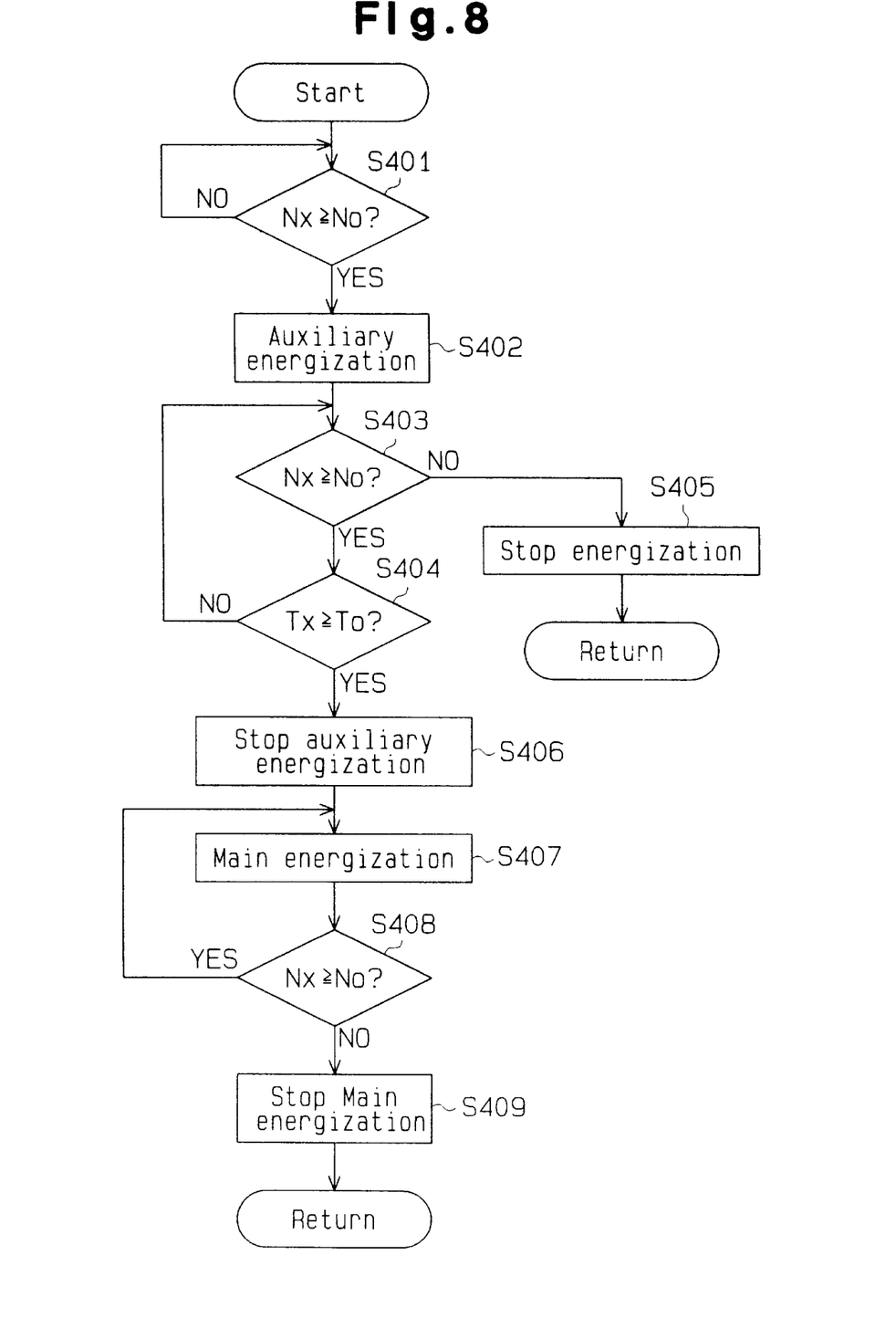
FIG. 8 is a flow chart showing a process for controlling the auxiliary heater according to the fourth embodiment.

FIG. 8 is a flow chart showing the energization control of the electromagnetic clutch 35 and the cooling fans 23 and 19 by the auxiliary heating controller 43. In the routine shown by this flow chart, the engine 11 is started while the auxiliary heating switch 39 is turned on.

In step S401, the auxiliary heating controller 43 determines whether the rotational speed Nx of the engine 11 has reached the preset rotational speed No. When "YES" is decided in step S401, the auxiliary heating controller 43 performs auxiliary-energization of the electromagnetic clutch 35 and the cooling fan 23 in step S402. Then, in step S403, the auxiliary heating controller 43 determines again whether the rotational speed Nx of the engine 11 exceeds or is equal to the preset rotational speed No. That is, it is judged whether the rotation of the engine 11 has fallen after the electromagnetic clutch 35 and the cooling fan 23 were energized. When "YES" is decided in step S403, step S404 is executed. However, when "NO" is decided in step S403, the energization of the electromagnetic clutch 35 and the cooling fan 23 is stopped in step S405 because it is decided that the rotational speed Nx of the engine 11 has fallen below the preset rotational speed No.

In step S404, the auxiliary heating controller 43 determines whether a coolant temperature Tx detected by the temperature sensor 17 has reached a preset coolant temperature To. When "YES" is decided in step S404, that is, when the coolant temperature Tx detected by the temperature sensor 17 reaches the preset coolant temperature To, the auxiliary heating controller 43 stops the auxiliary-energization in step S406. However, when "NO" is decided in step S404, the controller 43 continues the auxiliary-energization.

Then, in step S407, the auxiliary heating controller 43 performs the main energization of the cooling fan 19. When the main energization is executed, the cooling fan 19 operates. Then, in step S408, the auxiliary heating controller 43 determines again whether the rotational speed Nx of the engine 11 is greater than or equal to the preset rotational speed No. When "YES" is decided in step S408, the auxiliary heating controller 43 continues the main energization. However, when "NO" is decided in step S408, the auxiliary heating controller 43 stops the main energization of the cooling fan 19 in step S409. That is, the energization of the fan 19 is stopped when the engine is stopped.

In the fourth embodiment, the following advantages are obtained, which are the same as those obtained in the first embodiment.

When the heating switch 44 is turned on, the heating action is automatically changed from the auxiliary heating system to the main heating system, and therefore, the time and labor for changing the heating action from the auxiliary heating system to the main heating system can be omitted.

Figure 9:
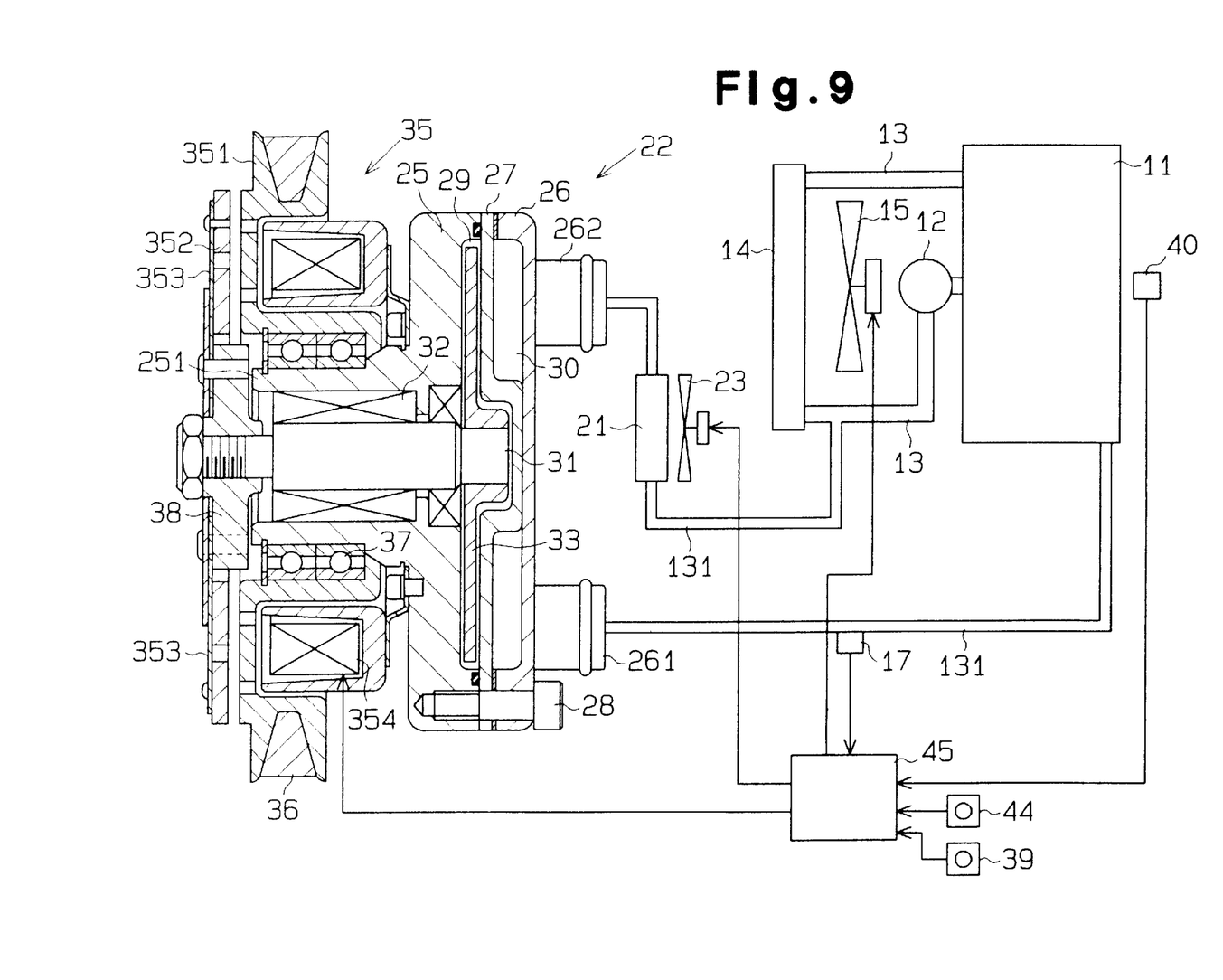
FIG. 9 is a cross-section schematic diagram showing the outline of a main heating system and an auxiliary heating system of a fifth embodiment.

The fifth embodiment will be described with reference to FIGS. 9 and 10. In FIG. 9, components that are the same as those of the fourth embodiment are identified with the same reference numerals.

This embodiment is different from the fourth embodiment in that the auxiliary passage 132, the radiator 16, and the cooling fan 19 are omitted. A heating controller 45 performs energization control of the electromagnetic clutch 35 and the cooling fan 23. The temperature sensor 17 outputs detected coolant temperature information to the heating controller 45. The heating controller 45 becomes ready for control only when the heating switch 44 is turned on.

Figure 10:
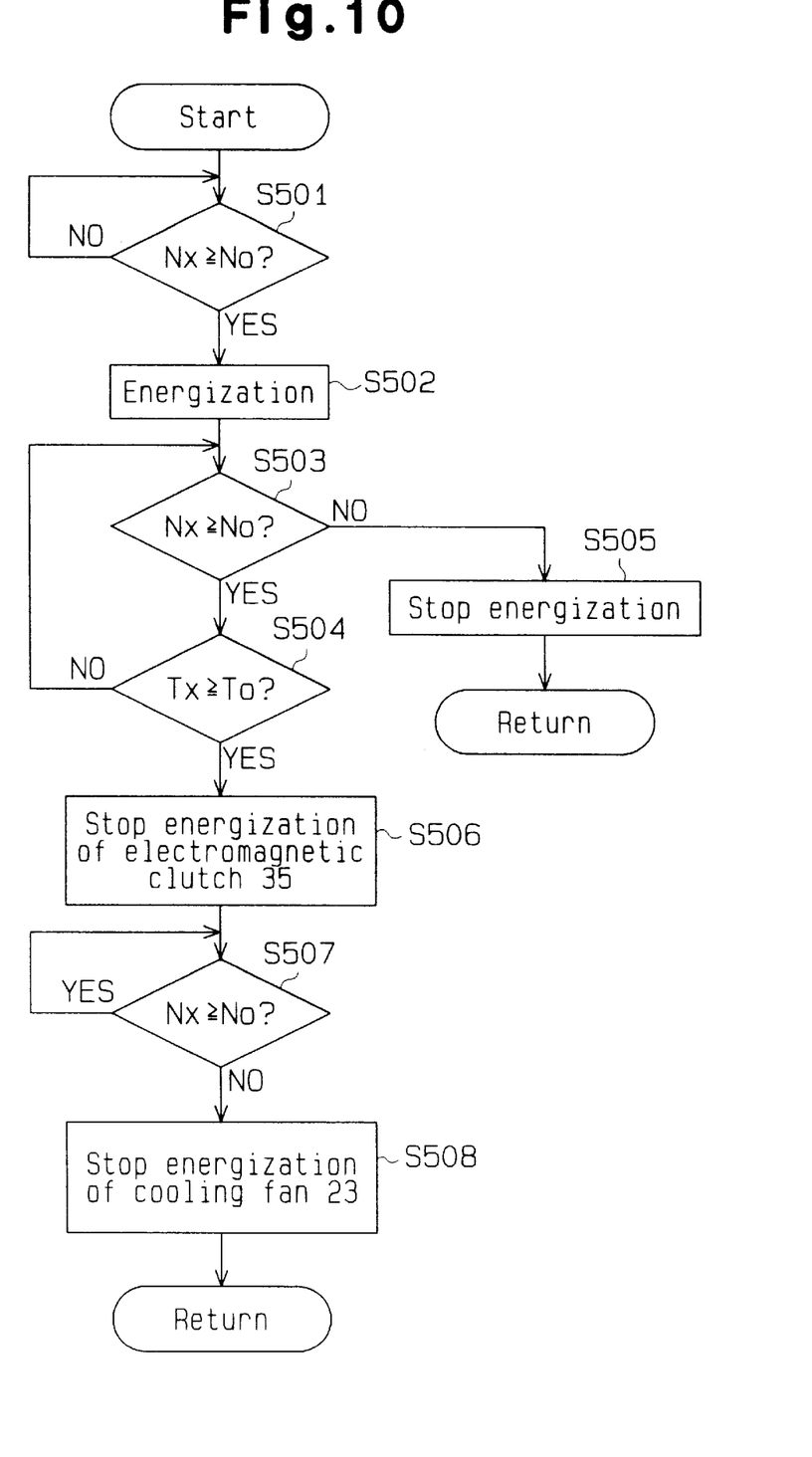
FIG. 10 is a flow chart showing a process for controlling the auxiliary heater according to the fifth embodiment.

FIG. 10 is a flow chart showing the energization control of the electromagnetic clutch 35 and the cooling fan 23 by the heating controller 45. In the routine shown by this flow chart, the operation for starting the engine 11 is performed while the auxiliary heating switch 39 is turned on.

In step S501, the auxiliary heating controller 45 determines whether the rotational speed Nx of the engine 11 has reached the preset rotational speed No. When "YES" is decided in step S501, the heating controller 45 energizes the electromagnetic clutch 35 and the cooling fan 23 in step S502. Subsequently, in step S503, the heating controller 45 determines again whether the rotational speed Nx of the engine 11 is greater than or equal to the preset speed No. That is, it is judged whether, after the electromagnetic clutch 35 and the cooling fan 23 were energized, the rotation speed of the engine 11 has reached speed No. When "YES" is decided in step S503, step S504 is executed. However, when "NO" is decided in step S504, energization of the electromagnetic clutch 35 and the cooling fan 23 is stopped because the rotational speed Nx of the engine 11 has fallen below the preset rotational speed No.

In step S504, the heating controller 45 determines whether the coolant temperature Tx detected by the temperature sensor 17 has reached the preset coolant temperature To. When "YES" is decided in step S504, that is, when the coolant temperature Tx detected by the temperature sensor 17 has reached the preset coolant temperature To, the heating controller 45 stops the energization of the electromagnetic clutch 35 in step S506. However, when "NO" is decided in step S504, the controller 45 continues auxiliary-energization by returning to step S503.

Then, in step S507, the heating controller 45 determines again whether the rotational speed Nx of the engine 11 is equal to or greater than the preset rotational speed No. When "NO" is decided in step S507, for example, when the engine 11 is stopped, the heating controller 45 stops the energization of the cooling fan 23 in step S508.

The following advantages are obtained in the fifth embodiment, in addition to those of the first embodiment.

The radiator 21 and the cooling fan 23 also serve both as a part of an auxiliary heating system and a part of a main heating system. When the heating switch 44 is turned on, the heating action is automatically changed from the auxiliary heating system to the main heating system. Therefore, the time and labor for changing the heating action from the auxiliary heating system to the main heating system can be omitted.

When the radiator 21 and the cooling fan 23 serve as a part of an auxiliary heating system and a part of a main heating system, the entire arrangement of a heating system is simplified, and it reduces cost.

The present example and embodiments are to be considered as illustrative and not restrictive and the invention is not to be limited to the details given herein, but may be modified within the scope of the claims.

The present invention can also be applied to a vehicle using an auxiliary heating system operated by the driving force of a vehicle engine via equipment such as a gear pump heater or eddy current heater.

What is claimed is:

1. A method for controlling a viscous heater auxiliary heating system for a vehicle, the vehicle having an engine, an engine cooling system in which a coolant is heated, a passenger compartment, a main heating system for heating the passenger compartment using heat from the coolant, and an auxiliary heating system, wherein the auxiliary heating system uses the driving force of the engine to heat the coolant separately from the engine cooling system, the method comprising the steps of:

a) automatically preventing the transfer of the driving force of the engine to the auxiliary heating system when the engine is being started and heating has been requested by the operator; and b) automatically transferring the driving force of the engine to the auxiliary heating system when the engine reaches running speed.

2. The method according to claim 1, including the steps of:

generating a start signal indicating that the engine is being started; and performing step b) only when a predetermined time period has passed after the start signal is generated.

3. The method according to claim 1, wherein said transfer of the engine driving force is to a viscous heater of said auxiliary heating system for generating heat therein by agitating a viscous fluid.

4. An auxiliary heating control apparatus for a vehicle, the vehicle having an engine, an engine cooling system in which a coolant is heated, a passenger compartment, a main heating system for heating the passenger compartment using heat from the coolant, and a viscous heater auxiliary heating system, wherein the auxiliary heating system uses the driving force of the engine to heat the coolant separately from the engine cooling system, the apparatus comprising:

torque transfer means for transferring the driving force of the engine to said viscous heater, wherein the torque transfer means has an engaged state where the driving force of the engine is transferred to the viscous heater and a disengaged state where the viscous heater is not operated;

means for judging whether the engine has reached a predetermined running speed; and control means responsive to said judging means for switching the torque transfer means between an engaged state and a disengaged state, wherein the control means switches the torque transfer means to the engaged state only when the judging means judges that the engine has reached the predetermined running speed.

5. The apparatus according to claim 4, further comprising means for generating a start signal for indicating when the engine is being started, wherein the control means switches the torque transfer means to the engaged state only when a predetermined time period has passed after the start signal is generated.

6. The apparatus according to claim 4, wherein the torque transfer means is an electromagnetic clutch.

7. The apparatus according to claim 4, wherein the viscous heater further comprises:
- a heat generating chamber for accommodating a viscous fluid and a rotor element within the heat generating chamber;
- a heat receiving chamber for receiving heat from the heat generating chamber and for accommodating circulating cooling fluid; and
- a housing for housing the heat generating chamber and the heat receiving chamber.

8. A method for controlling an auxiliary heating system for a vehicle, the vehicle having an engine, an engine cooling system in which a coolant is heated, a passenger compartment, a main heating system for heating the passenger compartment using heat from the coolant, and an auxiliary heating system, wherein the auxiliary heating system uses the driving force of the engine to heat the coolant separately from the engine cooling system, the method comprising the steps of:
- a) automatically preventing the transfer of the driving force of the engine to the auxiliary heating system when the engine is being started and heating has been requested by the operator; and
- b) determining the rotating speed of the engine and automatically transferring the driving force of the engine to the auxiliary heating system when the engine has reached a predetermined rotational speed.

9. A method for controlling an auxiliary heating system for a vehicle, the vehicle having an engine, an engine cooling system in which a coolant is heated, a passenger compartment, a main heating system for heating the passenger compartment using heat from the coolant, and an auxiliary heating system, wherein the auxiliary heating system uses the driving force of the engine to heat the coolant separately from the engine cooling system, the method comprising the steps of:
- a) automatically preventing the transfer of the driving force of the engine to the auxiliary heating system when the engine is being started and heating has been requested by the operator; and
- b) determining the rotating speed of the engine and automatically transferring the driving force of the engine to the auxiliary heating system when a predetermined time period has elapsed after the engine has reached a predetermined rotational speed.

10. An auxiliary heating control apparatus for a vehicle, the vehicle having an engine, an engine cooling system in which a coolant is heated, a passenger compartment, a main heating system for heating the passenger compartment using heat from the coolant, and an auxiliary heating system, wherein the auxiliary heating system uses the driving force of the engine to heat the coolant separately from the engine cooling system, the apparatus comprising:
- torque transfer means for transferring the driving force of the engine to a heat generating means, wherein the torque transfer means has an engaged state where the driving force of the engine is transferred to the heat generating means and a disengaged state where the heat generating means is not operated;
- means for judging whether the engine has reached a predetermined running condition including a speed detector for detecting the rotating speed of the engine; and
- control means responsive to said judging means for switching the torque transfer means between an engaged state and a disengaged state, wherein the control means switches the torque transfer means to the engaged state only when the judging means judges that the engine has reached the predetermined running condition.

11. An auxiliary heating control apparatus for a vehicle, the vehicle having an engine, an engine cooling system in which a coolant is heated, a passenger compartment, a main heating system for heating the passenger compartment using heat from the coolant, and an auxiliary heating system, wherein the auxiliary heating system uses the driving force of the engine to heat the coolant separately from the engine cooling system, the apparatus comprising:
- torque transfer means for transferring the driving force of the engine to a heat generating means, wherein the torque transfer means has an engaged state where the driving force of the engine is transferred to the heat generating means and a disengaged state where the heat generating means is not operated;
- means for judging whether the engine has reached a predetermined running condition; and
- control means responsive to said judging means for switching the torque transfer means between an engaged state and a disengaged state, wherein the control means switches the torque transfer means to the engaged state only when the judging means judges that the engine has reached a predetermined rotating speed.

12. An auxiliary heating control apparatus for a vehicle, the vehicle having an engine, an engine cooling system in which a coolant is heated, a passenger compartment, a main heating system for heating the passenger compartment using heat from the coolant, and an auxiliary heating system, wherein the auxiliary heating system uses the driving force of the engine to heat the coolant separately from the engine cooling system, the apparatus comprising:
- torque transfer means for transferring the driving force of the engine to a heat generating means, wherein the torque transfer means has an engaged state where the driving force of the engine is transferred to the heat generating means and a disengaged state where the heat generating means is not operated;
- means for judging whether the engine has reached a predetermined running condition; and
- control means responsive to said judging means for switching the torque transfer means between an engaged state and a disengaged state, wherein the control means switches the torque transfer means to the engaged state only after a predetermined time period has elapsed from when the judging means judges that the engine has reached a predetermined running speed.

* * * * *